UNITED STATES PATENT OFFICE.

PAUL A. STARKE, OF BERKELEY, CALIFORNIA.

PROCESS FOR THE SYNTHETIC PRODUCTION OF AMMONIA.

1,256,273.  Specification of Letters Patent.  Patented Feb. 12, 1918.

No Drawing.  Application filed September 11, 1916. Serial No. 119,576.

*To all whom it may concern:*

Be it known that I, PAUL A. STARKE, a citizen of the United States, residing at Berkeley, in the county of Alameda and State of California, have invented certain new and useful Improvements in Processes for the Synthetic Production of Ammonia, of which the following is a specification.

My invention relates to the synthetic production of ammonia by the reaction of a mixture of hydrocarbon gas and nitrogen in the presence of a catalytic agent.

In previous experiments in which Eric A. Starke collaborated, working principally with methane, especially natural gas, and with air, and a special catalyzer the peculiarity of which rested in the absence therefrom of carbon as a chemical reactive agent, we found that without regard to pressure but at a high temperature cyanids were formed which could then, if desired, be converted, as by superheated steam, into formates and ammonia and the latter recovered by condensation. This discovery resulted in and is fully disclosed by Letters Patent of the United States No. 1,206,155, Nov. 28, 1916, to which patent reference is hereby made. Later experiments conducted by me have led to the discovery that ammonia in commercial quantities can be formed directly by the catalyzer without passing through the cyanid stage, if regard be had both to pressure and temperature, that is to say, a sufficiently high pressure, and at a temperature below that at which cyanids are formed. It is in this discovery that my present invention consists.

I shall now describe my process in detail. The catalytic agent is composed of alkaline substances to which a metal of the iron group, such as iron, nickel, cobalt, chromium or aluminum, is best added to accelerate the reaction. In its best form it comprises a mixture of sodium carbonate, magnesium oxid, and iron, the latter being either finely divided metallic iron, or the oxid of iron.

As an example, the proportions of these components of the catalyzer may be given as follows:—sodium carbonate 20 parts; magnesium oxid 30 parts; metallic iron 50%. This mixture is prepared by grinding it thoroughly and then placing it in a furnace and heating it up to say between 400 and 800 degrees centigrade. No carbon is included as a chemical reactive agent, but I may state that the inclusion of a small amount of carbon to increase the porosity of the mass, may be a benefit. Instead of carbon, for this purpose, I may include in the mixture some sticky material such as crude oil or molasses. The gaseous mixture from which the desired reactions, in the presence of the catalytic agent, are had, is composed of hydrocarbon gas and nitrogen. The hydrocarbon gas may be various, and either artificially prepared or natural. I prefer to use some form of saturated hydrocarbon or a mixture of these, as, for instance, natural gas, on account of its abundance and availability. Such gases or mixtures are advantageous in that they, themselves, furnish the carbon necessary for the reaction. As a convenient source of nitrogen, I prefer to use atmospheric air.

As an example of my gaseous mixture I give three parts by volume of atmospheric air and 14 parts by volume of natural gas, though I do not confine myself to these proportions.

In carrying out my process I place the catalytic agent in a retort and heat it to a temperature below that at which cyanids will be formed and I then pass the gaseous mixture through the catalyzer under a pressure sufficiently high to form ammonia therein.

Both the temperature and pressure may vary, and they may vary relatively to each other, that is conversely, for if I use a higher pressure I use a lower temperature and vice versa. In general, the temperature ranges between 400 and 800 degrees centigrade, and the pressure between 7 and 200 atmospheres; and I find that the yield of ammonia is materially increased by raising the pressure. As an example, I have found that a temperature of 600 degrees centigrade, and a pressure of 200 atmospheres give the best yield. The ammonia formed is recovered by absorption as ammonium sulfate, or liquefied by a suitable apparatus.

I claim:—

1. The process for the synthetic production of ammonia which consists in passing a mixture of hydrocarbon gas and nitrogen through a catalytic agent comprising substances capable of reacting to form cyanid, the passage of said mixture being at a temperature below that at which cyanid would be formed as the result of reaction and under a pressure sufficiently high to form ammonia therein, and then recovering said ammonia.

2. The process for the synthetic production of ammonia which consists in passing a mixture of hydrocarbon gas and nitrogen through a catalytic agent composed of alkaline substances and a metal of the iron group, at a temperature below that at which cyanid would be formed as the result of reaction and under a pressure sufficiently high to form ammonia therein, and then recovering said ammonia.

3. The process for the synthetic production of ammonia which consists in passing a mixture of hydrocarbon gas and nitrogen through a catalytic agent comprising substances capable of reacting to form cyanid, the passage of said mixture being devoid of carbon as a chemical reactive agent, at a temperature below that at which cyanid would be formed as the result of reaction and under a pressure sufficiently high to form ammonia therein, and then recovering said ammonia.

4. The process for the synthetic production of ammonia which consists in passing a mixture of hydrocarbon gas and nitrogen through a catalytic agent devoid of carbon as a chemical reactive agent and composed of alkaline substances and a metal of the iron group, at a temperature below that at which cyanid would be formed as the result of reaction and under a pressure sufficiently high to form ammonia, and then recovering said ammonia.

5. The process for the synthetic production of ammonia which consists in passing a mixture of hydrocarbon gas and nitrogen through a catalytic agent comprising substances capable of reacting to form cyanid, the passage of said mixture being at a temperature not greater than 800 degrees centigrade and under a pressure not less than 7 atmospheres, to form ammonia therein and then recovering said ammonia.

6. The process for the synthetic production of ammonia which consists in passing a mixture of hydrocarbon gas and nitrogen through a catalytic agent composed of alkaline substances and a metal of the iron group, at a temperature not greater than 800 degrees centigrade and under a pressure not less than 7 atmospheres, to form ammonia therein, and then recovering said ammonia.

7. The process for the synthetic production of ammonia which consists in passing a mixture of hydrocarbon gas and nitrogen through a catalytic agent devoid of carbon as a chemical reactive agent and at a temperature not greater than 800 degrees centigrade and under a pressure not less than 7 atmospheres, to form ammonia therein and then recovering said ammonia.

8. The process for the synthetic production of ammonia which consists in passing a mixture of hydrocarbon gas and nitrogen through a catalytic agent devoid of carbon as a chemical reactive agent and composed of alkaline substances and a metal of the iron group, at a temperature not greater than 800 degrees centigrade and under a pressure not less than 7 atmospheres, to form ammonia therein and then recovering said ammonia.

9. In the process for the synthetic production of ammonia by catalysis, that step which consists in subjecting a mixture of natural gas and atmospheric air, under a temperature not greater than 800 degrees centigrade and under a pressure not less than 7 atmospheres, to a catalytic agent devoid of carbon as a chemical agent.

In testimony whereof I have signed my name to this specification in the presence of two subscribing witnesses.

PAUL A. STARKE.

Witnesses:
 WM. F. BOOTH,
 D. B. RICHARDS.